J. A. HARRIS & A. W. HOWARD.
NUT LOCK.
APPLICATION FILED OCT. 30, 1916.
1,240,568.
Patented Sept. 18, 1917.
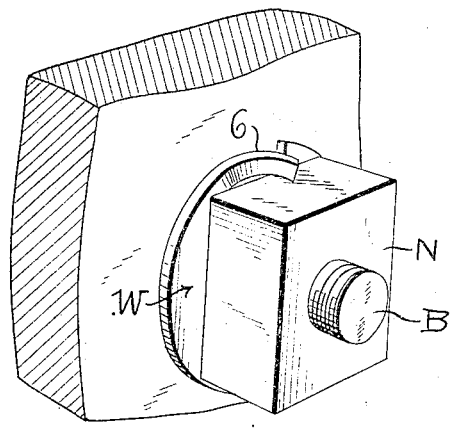
Fig. 1
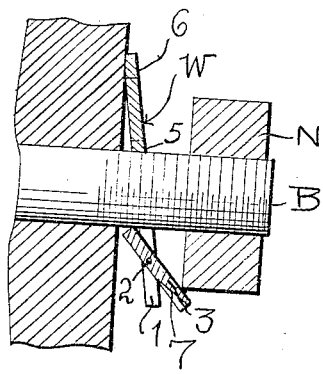
Fig. 2
Fig. 3
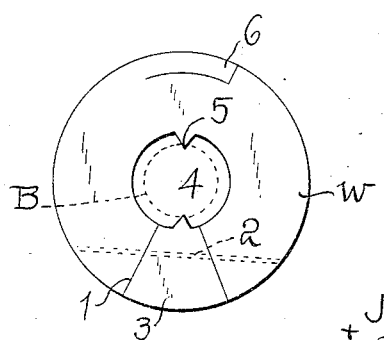
Inventors
J. A. HARRIS
+ A. W. HOWARD
By Watson E. Coleman
Attorney

UNITED STATES PATENT OFFICE.

JOSEPH A. HARRIS AND ARTHUR W. HOWARD, OF CLARENDON, TEXAS.

NUT-LOCK.

1,240,568.  Specification of Letters Patent.  Patented Sept. 18, 1917.

Application filed October 30, 1916. Serial No. 128,524.

*To all whom it may concern:*

Be it known that we, JOSEPH A. HARRIS and ARTHUR W. HOWARD, citizens of the United States, residing at Clarendon, in the county of Donley and State of Texas, have invented certain new and useful Improvements in Nut-Locks, of which the following is a specification, reference being had to the accompanying drawings.

This invention relates to certain improvements in nut locks and it is an object of the invention to provide novel and improved means whereby a nut may be coupled to a bolt in order to hold the nut against retrograde movement.

It is also an object of the invention to provide a nut lock including a novel and improved washer provided with a pivoted tooth which is adapted to impinge the bolt under the influence of the nut during the application of the nut to the bolt.

The invention consists in the details of construction and in the combination and arrangement of the several parts of our improved nut lock whereby certain important advantages are attained and the device is rendered simpler, less expensive and otherwise more convenient and advantageous for use, all as will be hereinafter more fully set forth.

The novel features of the invention will hereinafter be definitely claimed.

In order that our invention may be the better understood, we will now proceed to describe the same with reference to the accompanying drawings, wherein—

Figure 1 is a view in perspective illustrating a nut lock constructed in accordance with an embodiment of our invention and in applied position;

Fig. 2 is a sectional view taken through the device as disclosed in Fig. 1 showing our improved nut lock in initial position; and Fig. 3 is a view in top plan of our improved washer, a coacting bolt being indicated by dotted lines.

As disclosed in the accompanying drawings, B denotes a bolt of ordinary construction and with which is adapted to coact the nut N.

W denotes a washer adapted to embrace the bolt and be inserted between the nut N and the work, and said washer has a portion thereof cut away, as at 1, and pivotally mounted, as at 2, within said cut away portion 1 is a section or member 3 provided with an inwardly directed tooth 4 intersecting the bore or opening of the washer W. It is also preferred that a second tooth 5 be carried by the washer diametrically opposed to the pivoted section 3 and also disposed inwardly of the bore or opening of the washer W. The periphery of the washer W is provided with the tongue 6 adapted to overlie a side of the nut N when the same is in applied position upon the bolt B for a purpose which is believed to be self-evident.

In applying the washer W to the bolt B it is necessary that the section 3 be swung on a downward and inward incline as under normal conditions the teeth 4 and 5 will obstruct the application of the washer W to the bolt B. As the nut N is turned upon the bolt the same will engage the outer portion of the pivoted member 3 and thereby force the teeth 4 of said member into the bolt B and also cause the teeth 5 to impinge said bolt. By this means it will be readily understood that the washer W is effectively engaged with the bolt B and that the nut N is held against retrograde movement through the medium of the tongue 6.

It is also to be stated that in the event the work should be of soft material such as wood and the nut or tap N is not drawn down tight enough when flat against the washer W, said nut or tap can still be turned as the teeth 4 and 5 will be forced downward or inward of the bolt B and cutting the threads thereof, as this longitudinal movement of the washer W is ordinarily very slight whereby it will be at once self-evident that the threads will not be injured to any considerable extent.

The outer portion of the face of the member 3 opposed to the work is reduced or beveled, as at 7, so that a suitable implement may be inserted under the outer portion of said member 3, after the nut N has been removed, to facilitate the disengagement of the washer W from the bolt B.

From the foregoing description, it is thought to be obvious that a nut lock constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice, except as hereinafter claimed.

We claim:

1. As a new article of manufacture, a washer having a portion cut away, and a member pivotally supported within said cut-away portion of the washer and provided with a tooth intersecting the bore of the washer when said member is substantially flush with the washer.

2. As a new article of manufacture, a washer having a portion cut away, a member pivotally supported within said cut-away portion of the washer and provided with a tooth intersecting the bore of the washer when said member is substantially flush with the washer, and a second tooth carried by the washer and intersecting the bore thereof.

3. As a new article of manufacture, a washer having a portion cut away, and a member pivotally supported within said cut-away portion of the washer and provided with a tooth intersecting the bore of the washer when said member is substantially flush with the washer, said washer being provided with means engageable with the side of a nut or the like.

4. As a new article of manufacture, a washer having a portion cut away, and a member pivotally supported within said cut-away portion of the washer and provided with a tooth intersecting the bore of the washer when said member is substantially flush with the washer, the outer portion of said pivoted member being beveled.

5. In combination with a bolt and a nut engageable therewith, a washer surrounding the bolt, and a movable tooth carried by the washer and engageable with the bolt under the influence of the nut, the outer portion of the face of the movable tooth remote from the nut being beveled.

In testimony whereof we hereunto affix our signatures in the presence of two witnesses.

JOSEPH A. HARRIS.
ARTHUR W. HOWARD.

Witnesses:
DEE BAKER,
B. F. NAYLOR.